United States Patent Office 3,570,322
Patented Mar. 16, 1971

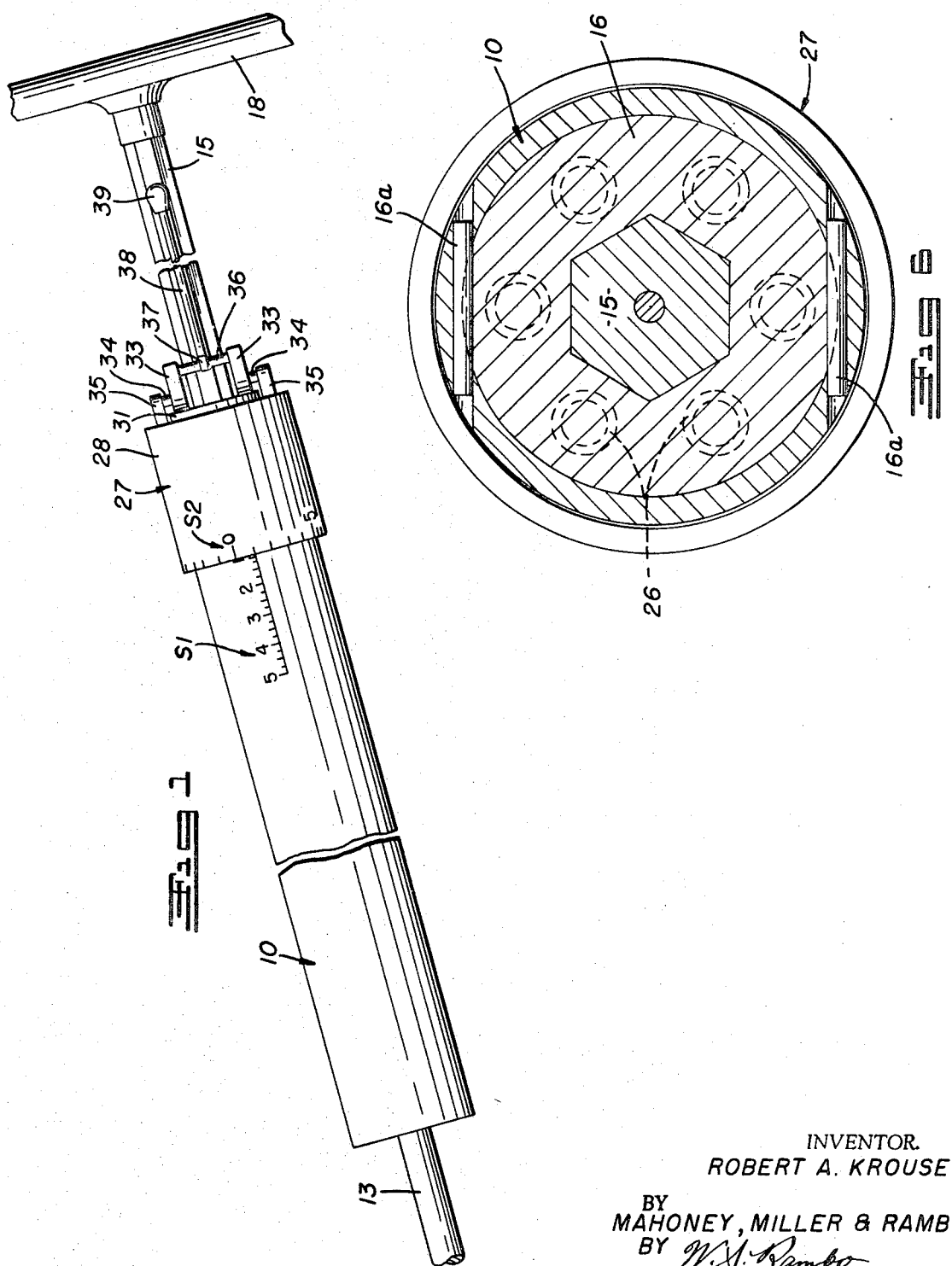

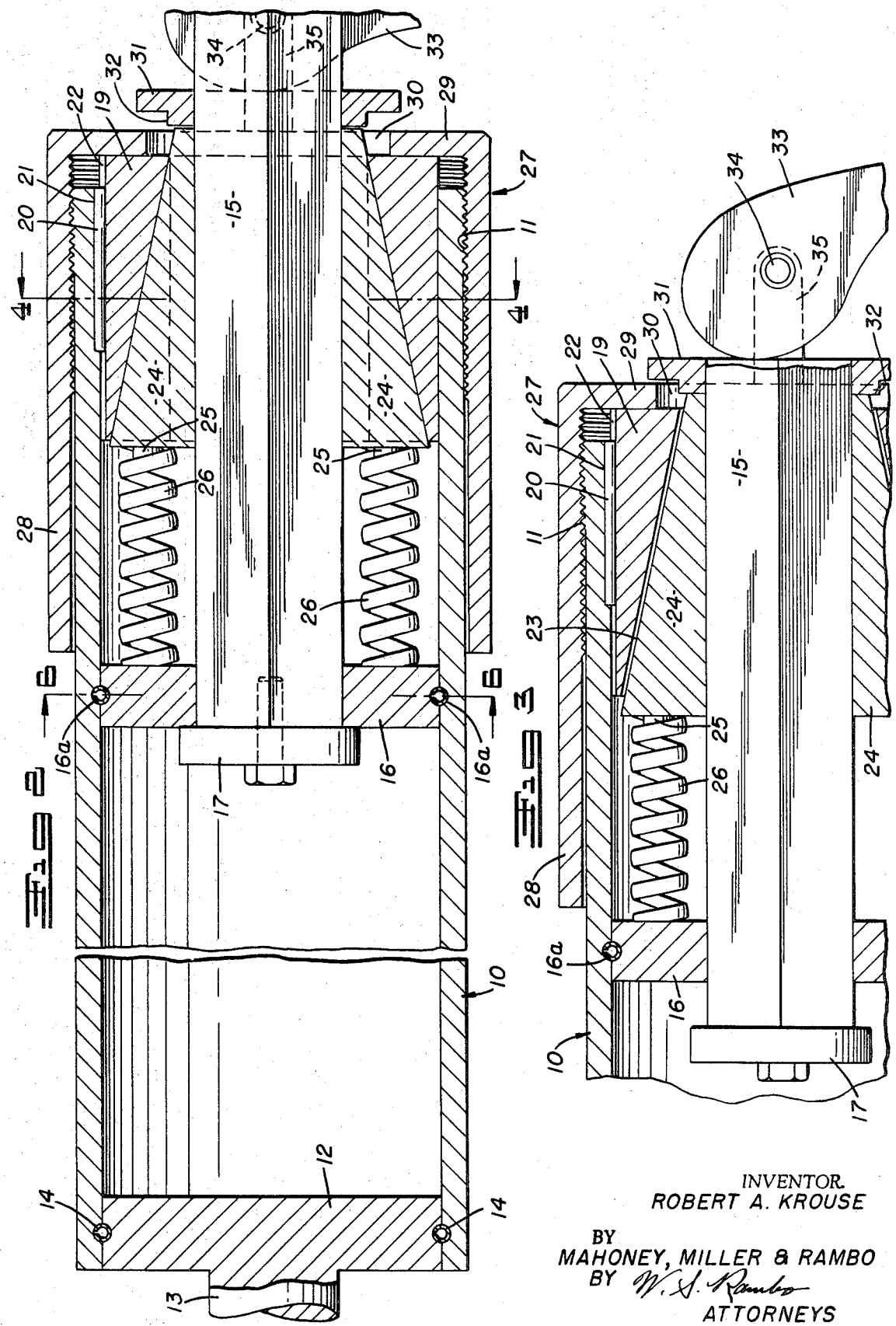

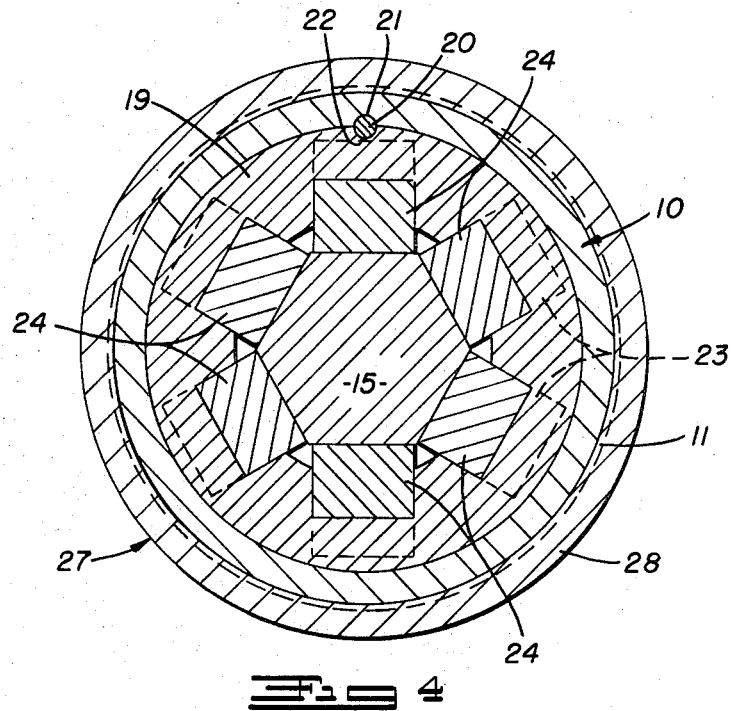
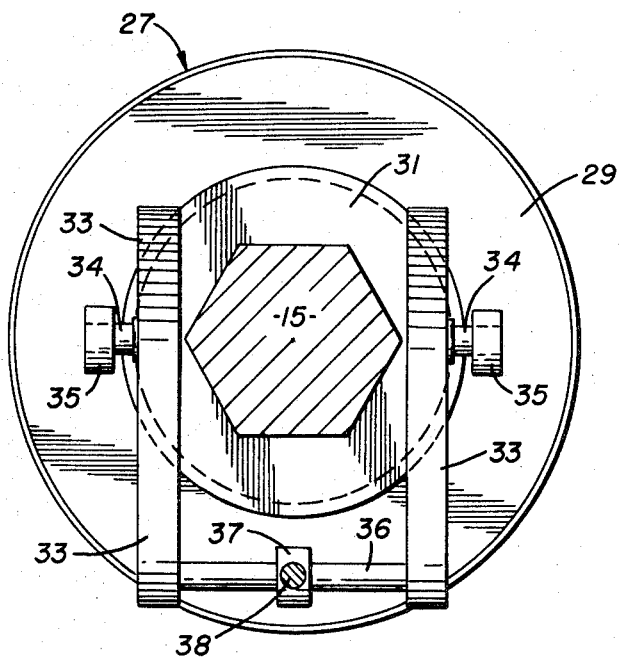

3,570,322
AXIALLY ADJUSTABLE AND COLLAPSIBLE STEERING COLUMN
Robert A. Krouse, 756 Temple Road,
Pottstown, Pa. 19464
Filed Apr. 18, 1969, Ser. No. 817,336
Int. Cl. B62d 1/18
U.S. Cl. 74—493
4 Claims

ABSTRACT OF THE DISCLOSURE

A vehicle steering column embodying relatively telescoping tube and shaft members drivingly connected for unified rotation, but moveable axially relative to one another in response to either intentional manually applied, adjusting forces, or to accidentially applied, impact forces, with means to adjust the resistance of the column to collapse in response to impact forces.

BACKGROUND OF THE INVENTION

The present invention relates generally to steering columns for motor vehicles, and more specifically, to an improved energy-absorbing steering column which is adjustable in length for the comfort of the driver and which is collapsible axially in response to predetermined impact forces applied to either end of the steering column.

In the past, various types of collapsible steering columns have been proposed and used, but generally, the prior art columns lacked at least one of the qualities necessary for a safe steering column. For example, certain prior art steering columns are designed to collapse, but do not absorb any of the energy which is created during an impact. Others collapse, but sacrifice the steering capabilities, and are either very fragile and apt to be harmed during maintenance or installation, or are incapable of being preset accurately to collapse under a predetermined force. Most of the prior art collapsible steering columns have been expensive to produce, and, once collapsed, impossible to repair.

It is, therefore, the principal object of the present invention to provide a mechanically simple, yet efficient, steering column which may be manually adjusted in length and which is collapsible axially in response to the application of a predetermined impact force to either end of the column.

Another object of this invention is to provide a collapsible steering column which will retain its steering capacity during and following collapse, and one which is capable of accurately transmitting input steering torque to the steering gears without looseness or lost motion in the column structure.

Yet another object of this invention is to provide a collapsible steering column whose resistance to axial collapse may be adjusted so as to make the steering column safe for relatively lightweight drivers as well as heavier weight drivers.

For a further and more detailed understanding of the present invention, and the various additional objects and advantages derived therefrom, reference is made to the following description and the accompanying drawings, wherein:

FIG. 1 is a side elevational view of a steering column according to the present invention;

FIG. 2 is an enlarged, medial longitudinal sectional view taken through the steering column;

FIG. 3 is a fragmentary longitudinal sectional view showing the steering column in condition for manual adjustment of its length;

FIG. 4 is a transverse vertical sectional view taken along the line 4—4 of FIG. 3;

FIG. 5 is a transverse vertical sectional view taken through the torque input shaft of the steering column and showing particularly the arrangement of the wedge-releasing cams of the steering column; and FIG. 6 is a transverse vertical sectional view taken along the line 6—6 of FIG. 2.

With reference to the drawings, it will be seen that the present steering column includes an elongated, hollow, cylindrical tube 10 which is formed at one end with an externally screw-threaded region 11. The opposite end of the tube 10 is closed by the enlarged cylindrical head 12 formed at the inner end of an output shaft 13 which has its opposite end suitably connected in the usual manner to the conventional steering gear or linkage of the vehicle, not shown. As will be noted in FIG. 3, the diameter of the head 12 is substantially equal to the inner diameter of the tube 10, and the head 12 is securely, rigidly and drivingly connected to the tube by tangential locking pins 14.

A torque input shaft 15 of multi-angular cross-section (in this case hexagonal) telescopes coaxially within the screw-threaded end of the tube 10 and is slidably, but non-rotatively, supported by a guide plate or washer 16 formed with a complemental multi-angular central opening through which the shaft 15 extends. The guide washer 16 is secured within the tube 10 by means of tangential locking pins 16a driven into drilled passages extending through the tube walls and tangentially through the edge of the washer 16 (see FIG. 6). A relatively enlarged stop washer 17 is bolted or otherwise secured to the end of the shaft 15 to prevent withdrawal of the shaft 15 from the guide washer 16. The opposite end of the input shaft 15 has secured thereto a conventional steering wheel 18 through which manually applied forces may be applied to rotate the shaft 15 in opposite directions.

Slidably positioned within the threaded end portion of the tube 10 is a sliding block or collar 19. The collar 19 is generally cylindrical and closely fits the inner diameter of the tube 10. However, the collar 19 is keyed against rotation within the tube 10 by means of a cylindrical pin or key 20 positioned in mating semi-circular keyways 21 and 22 formed, respectively, in the inner wall of the tube 10 and the peripheral surface of the collar 19. The collar 19 is of generally tubular construction, and has its inner wall surface formed with a plurality of axially chamfered recesses or channels 23. Each of the channels 23 is defined by a pair of relatively spaced, parallel side walls and an axially inclined bottom wall. The number and location of the chamfered channels 23 of the collar 19 correspond to the flatted or planar outer surfaces of the input shaft 15, in this case six. Slidably positioned in each of the channels 23 is a shaft-engaging, friction block or wedge 24. Each of the wedges 24 is in the shape of a hexahedron and corresponds closely in width and inclination to the chamfered channels 23 of the collar 19. However, the wedges 24 are sized to project radially inwardly beyond the inner wall surfaces of the collar 19 and into flat, planar engagement with the flatted side surfaces of the shaft 15. Also, the wedges 24 are relatively longer than the collar 19, so as to permit their thinner outer end portions to project outwardly beyond the collar 19 and the end of the tube 10. The relatively thicker, inner ends of the wedges 24 are formed or otherwise provided with cylindrical spring guides or seats 25 which telescope within an end of a like member of coiled compression springs 26 whose opposite ends abut the guide washer or wall 16.

The sliding collar 19 and wedges 24 are retained within the tube 10 by an internally screw-threaded end cap 27 which is threadedly engaged with screw-threaded end portion 11 of the tube 10. The end cap 27 is formed with a cylindrical barrel portion 28 and a partial end wall 29. The end wall 29 is formed with a central, circular opening 30 whose diameter is less than the outer diameter of the collar 19, but substantially greater than the maximum width of the input shaft 15, so as to permit the thinner outer end portions of the wedges 24 to project freely through the opening 30, as shown in FIG. 3. Preferably, the internal screw-threaded region of the end cap 27 extends only approximately one-half the length of the cap, so as to provide a slightly larger diameter, unthreaded inner wall surface toward the open end of the barrel 28 of the cap which serves to protect the externally threaded region 11 of the tube 10 when the end cap 27 is adjusted to its extreme outer position on the tube 10.

As will be readily apparent, the position of the guide washer or wall 16 and the lengths of the springs 26 and sliding collar 19 are correlated so as to place the springs under slight resilient compression when the threads of the end cap 27 are initially engaged with the threaded region 11 of the tube 10, and under maximum compression when the end cap 27 is fully threaded onto the tube 10. In this manner, the springs 26 will at all times exert an axially directed force on the wedges 24 which is directly proportional to the extent of compression of the springs, and the extent or degree of compression of the springs is, of course, directly proportional to the relative position of the end cap 27 on the tube 10. A component of the thrust forces applied to the wedges 24 by the springs 26 is vectored radially inwardly toward the input shaft 15 by reason of the relatively engaged, inclined surfaces of the wedges 24 and the collar 19. Thus, the wall 16, the collar 19, the wedges 24 and springs 26 and the end cap 27 define a chuck means to apply frictional forces to the input shaft 15 and thereby yieldably resist axial movement thereof relative to the tube 10 and its associated output shaft 13. The frictional force applied to the shaft 15 may be adjusted simply by screwing the end cap 27 inwardly on the tube 10 to increase the frictional force, or outwardly of the tube to decrease the frictional force.

As shown in FIG. 1, the outer surface of the tube 10 may be provided with a graduated scale S1 having a zero reference point arranged to coincide with the inner end edge of the end cap 27 when the springs 26 are compressed to a minimum degree. The inner edge of the end cap 27 serves as an index point to determine the extent of axial movement of the cap 27 relative to the tube 10 and away from the zero reference point of the scale S1. As shown, the scale S1 is divided into five equally spaced major graduations, with each of the major graduations being divided into four minor graduations. Each of the minor graduations of the scale corresponds to the linear pitch of the screw-threaded region 11 of the tube 10, and upon one revolution of the end cap 27, the inner edge of the cap will move longitudinally on the barrel one minor graduation. Additionally, the cap 27 may be provided adjacent its inner edge with a micrometer-type sub-scale S2 having graduations ranging from zero to twenty-five. Thus, each of the minor graduations on the scale S1 may be divided into twenty-five parts to enable a person to very accurately determine the relative position of the end cap 27 on the tube 10, and, thus, the relative force resisting axial movement of the shaft 15, or accidental collapse of the steering column.

Slidably carried on the shaft 15, adjacent the tapered ends of the wedges 24, is a circular or disk-shaped throw-out bearing or wear plate 31. The plate 31 is formed with a central, hexagonal opening to slidably, but non-rotatively fit the shaft 15. The plate 31 is also formed on its inner face with an axially extended annular shoulder 32 having an outer diameter substantially less than the diameter of the opening 30 formed in the end cap 27. The relatively thicker shoulder portion 32 of the plate 31 is arranged to butt against the tapered outer ends of the wedges 24 and to enter the opening 30 of the end cap 27 when it is desired to intentionally and manually adjust the axial position of the shaft 15 and steering wheel 18 relative to the tube 10.

Bearing against the outer face of the plate 31, and positioned on opposite sides of the shaft 15, are a pair of cam levers 33 which are supported for pivotal swinging movement on trunnions 34 journalled in a pair of bearing blocks 35. The bearing blocks 35 are welded or otherwise rigidly secured to the end wall 29 of the end cap 27 and project outwardly therefrom in diametrically opposed relation to one another. As best seen in FIG. 5, the outer ends of the cam levers 33 are joined to one another by a cross pin or shaft 36. Pivotally carried on the cross shaft 36 is a bearing eye or bushing 37 to which is rigidly connected the inner end of a remotely extending, cam-actuating shaft or rod 38. The outer end of the cam-actuating rod 38 may be equipped with a handle or knob 39 (see FIG. 1) which may be grasped and pulled upon to pivot the cam levers 33 in a counterclockwise direction and thereby force the throw-out bearing plate 31 inwardly to engage the thinner, tapered ends of the wedges 24 and shift the same slightly within the chamferred channels of the sliding block or collar 19, as illustrated in FIG. 3. This inward shifting of the wedges 24 relative to the collar 19 immediately reduces the frictional forces applied by the wedges to the input shaft 15, thus permitting the shaft 15 and its steering wheel to be adjusted axially inwardly or outwardly relative to the tube 10, and within limits established by contact of the stop washer 17 with the guide wall 16.

In the installation of the present steering column, the output shaft 13 and/or the tube 10 are suitably supported in the vehicle for axial rotation, but are held against axial linear displacement. The end cap 27 and cam-actuating knob or handle 39 are arranged for ready access and manipulation by the driver of the vehicle.

Thus, in operation, the wedges 24 are normally forced against the flat surfaces of the shaft 15 holding it tightly and solidly against relative rotation and against axial displacement relative to the tube 10. However, if an impact force of sufficient magnitude is applied to either end of the steering column, such as in a collision, the frictional forces applied to the shaft 15 will be overcome to thus permit the shaft 15 to telescope relative to the tube 10. In so doing, a large proportion of the input energy is dissipated by the friction between the wedges 24 and the shaft 15. The frictional force acting on the shaft 15 may be varied within limits by adjusting the longitudinal position of the retaining cap 27, so that a lighter weight person impacting the steering wheel will not have as great a force resisting his inertia as will a heavier person. In the collapsing energy-absorbing process, the parts of the steering column are not self-destructive and the column retains full steering capability. Thus, following a comparatively minor collison, the steering column may be restored to its original condition simply by readjusting the position of the input shaft 15 in the tube 10. The position of the steering wheel 18 may be readily adjusted in an axial direction to suit the comfort of the driver simply by actuating the knob or handle 39 to thus free the shaft 15 for movement inwardly or outwardly from the tube 10. Upon release of the handle 39, the springs 26 immediately restore the wedges 24 to their shaft-gripping positions.

In view of the foregoing, it will be seen that the present invention provides a mechanically simple, yet highly effective and rugged steering column which will axially collapse under dangerous impact conditions, yet will not sacrifice its steering capability for the collapsing function. While the primary purpose of this column is to protect whoever strikes it from serious injury, it also provides for intentional, manual adjustment in length for the comfort and safety of the driver. Another feature of this steering column is that ordinary wear or minor exterior damage to the parts of the mechanism will not result in looseness or lost motion in the steering function of the column.

While a single preferred embodiment of the invention has been disclosed in detail, it will be manifest that various modifications with regard to constructional details and design may be resorted to without departing from the spirit of the invention or the scope of the following claims.

Having thus described this invention, what is claimed is:

1. An axially collapsible steering column comprising an elongated tube; a shaft of multi-angular cross-section having an end portion telescoping within one end of said tube; chuck means drivingly connecting said tube and shaft for unified rotation while permitting relative inward telescoping movement of said tube and shaft in response to the application of a substantial, axially directed impact force at either end of said column, said chuck means including an axial, through passage of multi-angular cross-section conforming to that of said shaft and defined at least in part by a plurality of spring-pressed clamping elements frictionally engaged with said shaft and arranged normally to apply a frictional force to said shaft tending to resist relative inward telescoping movement of said shaft and tube, and a manually adjustable member for varying the frictional force applied to said shaft by said clamping elements.

2. A steering column as defined in claim 1, wherein said chuck means further includes a wall extending transversely within and fixed to said tube and formed with a central, multi-angular opening for said shaft, a guide collar moveable axially in said one end of said tube and having inclined surfaces engageable with complemental inclined surfaces formed on said clamping elements, compression spring means positioned in said tube between said wall and said clamping elements and arranged to force the inclined surfaces of said clamping elements into engagement with the inclined surfaces of said collar and thereby cause said elements to frictionally clamp said shaft, and wherein said manually adjustable member comprises an end cap threaded on said one end of said tube and engageable with said guide collar to move said collar and clamping elements axially within said tube in opposition to said spring means.

3. A steering column as defined in claim 2, including a graduated scale on said tube for indicating the relative position of said end cap on said tube and thereby the frictional force applied by said clamping elements to said shaft.

4. A steering column as defined in claim 1, including manually operable means comprising a plate slidable axially on said shaft and engageable with said clamping elements to disengage said clamping elements from said shaft and thereby relieve the frictional force applied to said shaft by said elements, and a cam lever engaging said plate and operable to slide said plate axially on said shaft.

References Cited
UNITED STATES PATENTS

| | | | |
|---|---|---|---|
| 2,639,626 | 5/1953 | Snyder | 74—493 |
| 3,165,942 | 1/1965 | Steiner et al. | 74—493 |
| 3,318,170 | 5/1967 | Runkle | 74—493 |
| 3,444,753 | 5/1969 | Runkle | 74—493 |

MILTON KAUFMAN, Primary Examiner

U.S. Cl. X.R.

74—531